March 22, 1927.  M. G. SACKERMAN ET AL  1,621,605
CLOTH CUTTING MACHINE
Filed Oct. 9, 1924
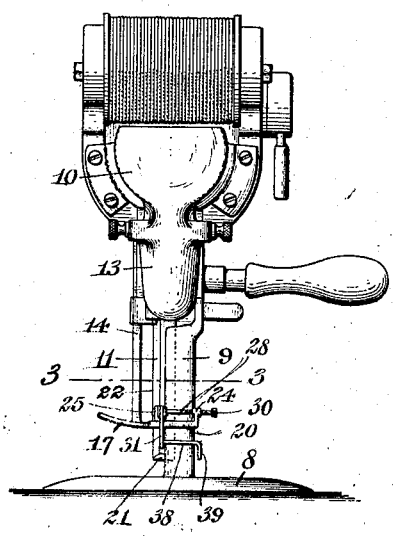
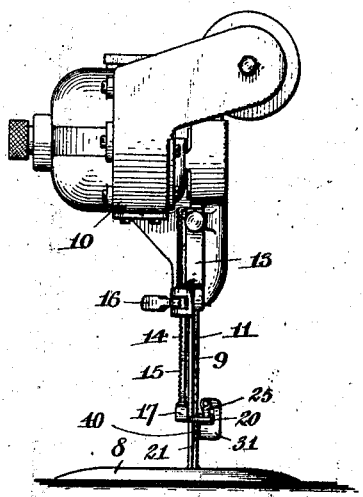
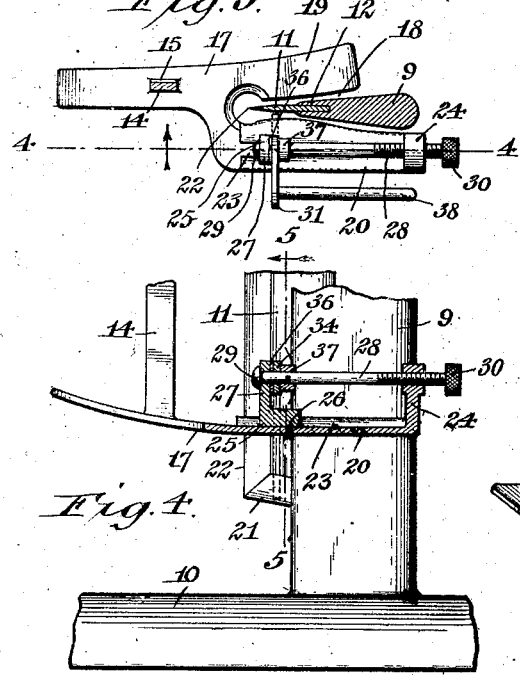
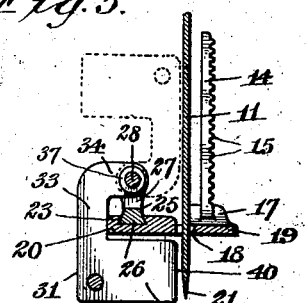
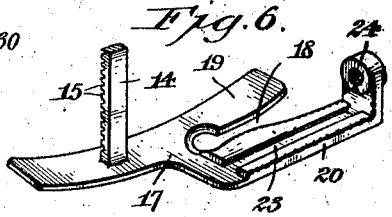
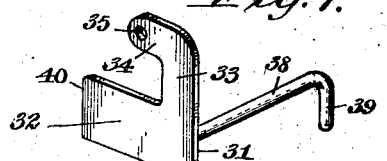

Patented Mar. 22, 1927.

1,621,605

UNITED STATES PATENT OFFICE.

MILTON G. SACKERMAN AND ISRAEL E. HELLER, OF BUFFALO, NEW YORK, ASSIGNORS TO EASTMAN MACHINE COMPANY, OF BUFFALO, NEW YORK.

CLOTH-CUTTING MACHINE.

Application filed October 9, 1924. Serial No. 742,536.

Our invention relates to improvements in cloth-cutting machines of the kind which is movable on a table or cutting surface on which the cloth or other material to be cut is supported.

In the manufacture of garments of various kinds, cloth is stacked in layers and either a paper pattern placed over the top of the stack or the upper layer of the stack has the pattern marked thereon, preparatory to cutting the pattern parts or members.

For the purpose of cutting the stack of cloth according to the outline of the pattern members, an electrically operated cutting machine is used which is movable freely over the table or surface on which the stack of material is supported, and when the cloth is cut according to pattern, the marginal portions of some of the pattern parts are provided with incisions or slits showing where adjoining pattern parts used in a garment are to be matched, and for this purpose another machine is employed.

Oftentimes the slitting is done during the process of cutting cloth according to pattern and before completely cutting all the pattern parts from the cloth, and this necessitates the handling of two machines, which are taken up for use numerous times during the cutting of the stack of cloth for a single type, style, or size of garment.

Owing to the many waste movements and time required in switching from one machine to another, and the expenditure of efforts, it has been the practice of many cutters to use the cutting machine for slitting the marginal portions of pattern parts, especially where the slitting is required between cutting operations on the same stack of cloth; but in using the cutting machine for slitting or notching, extreme care is required, as it is necessary to slit all the layers of the pattern parts cut from a single stack of cloth and at the same time prevent the slit being made into the cloth beyond a point intersecting a line or course along which two pattern parts are to be seamed. This has been an extremely difficult matter and necessitates slow and careful manipulation of the machine to prevent the slits or notches being extended inwardly beyond the line of the seam to be made on any layer of the stack, or otherwise an opening would appear at the seam connecting two pattern parts, and this opening would be in the form of a slit at a right angle to the direction of the seam. This is sometimes found in garments where the cutter uses a cutting machine for slitting the marginal portions of the pattern parts.

One of the objects of our invention is to provide a convertible cutting machine capable of being used as both a cutting machine and a slitting machine.

Another object of our invention is to provide a gage on a cutting machine, which is adapted to engage the edges of a stack of pattern parts when forcing the base of the machine underneath the stack, and which gage will enable the cutting knife to be used as a slitting device for slitting the marginal portions of the pattern parts adapted to be joined together by a seam, the slits being used as guides to determine the exact connection to be made between such pattern parts.

A further object of our invention is to provide a gage, which is adjustable so that the cutting knife of a cutting machine may be used for slitting the marginal portions of pattern parts according to the allowances made for seaming such pattern parts together.

With the above and other objects in view, the invention consists in a cloth-cutting machine convertible into a slitting machine for slitting the marginal portions of pattern parts to determine the exact manner in which pattern parts are to be joined together in the construction of a garment.

It also consists in providing any of the standard forms of cutting machines with a slitting gage whereby the machine can be positioned in such relation to a stack of cloth, that the knife of the cutting machine may be used as a slitting knife, with assurance that all layers will be slit or notched at their marginal portions to the same extent, and not beyond a certain point determined by the distance of said gage from the outermost point of said knife.

It further consists in applying to the standard of an electrically-driven cutting machine having a vertically-reciprocating knife, a gage movable into operative or inoperative position so that the knife may be used as a slitting knife, or as a cutting knife capable of being run through a stack of cloth and along pattern lines while reciprocating.

The invention further consists in a cutting machine having a stop gage movable into operative or inoperative position, and which, when in operative position will prevent the knife being moved into the stack of cloth beyond a certain point from the edge of the stack to be slitted and which, when in inoperative position will allow the cutting knife to be moved through the cloth along lines determining the outlines of pattern parts.

It still further consists in the novel features of construction and in the arrangement and combination of parts to be hereinafter described and more particularly pointed out in the subjoined claims.

In the drawings:—

Fig. 1 is a side elevation of a standard type of electrically-driven cutting machine.

Fig. 2 is a front elevation of the same.

Fig. 3 is an enlarged horizontal section taken on line 3—3, Fig. 1.

Fig. 4 is a vertical section taken on line 4—4, Fig. 3, looking in the direction of the arrow crossing said line.

Fig. 5 is a vertical section taken on line 5—5, Fig. 4, looking in the direction of the arrow crossing said line.

Fig. 6 is a sectional perspective view of the adjustable presser foot, its supporting bar, herein termed the presser bar, and the guide of the slitting gage integral with said presser foot.

Fig. 7 is a detached perspective view of the slitting gage, which may also be referred to as stop gage.

In the drawings, the reference numeral 8 designates the base of the machine which is provided with rollers (not shown), which roll in contact with the cutting table or other support when using the machine. This base has its marginal portion curved or beveled downwardly so that it can be easily rolled underneath a stack of cloth to be cut according to pattern.

Rising from the base is a standard or upright 9, which supports a motor and mechanism housing or casing 10; it being deemed unnecessary to illustrate the motor and the mechanism within the housing or casing, owing to the fact that these parts are commonly used and known to those skilled in the art to which this invention relates. The mechanism within the housing or casing, however, is operatively connected to a knife 11 which is guided for vertical movement in the standard or upright 9, said standard or upright being provided with a guide groove 12 in which said knife is slidably retained.

The housing or casing 10 has a depending portion 13 into which the upper end of the knife 11 extends, and within this depending portion said knife is connected to the operating mechanism contained within the housing or casing. This depending portion is slotted and in the slot thereof a presser bar 14 is vertically adjustable, it being provided along one side with teeth 15, and against this toothed side a spring-pressed pivoted pawl 16 engages.

At the lower end of said presser bar 14, which may also be termed a rack bar, is a presser foot 17 having its rear end widened and slotted, as at 18, forming a substantially forked rear end having the two members 19, 20 thereof lying at opposite sides of the standard or upright 9 and the knife 11. Said knife 11 has its lower end sharpened, as at 21, and its front edge 22 is also sharpened. The presser bar 14 is substantially parallel with the knife 11 and is disposed in advance of the longitudinal cutting edge of said knife and therefore serves as a guard to prevent the operator accidentally coming in contact with the knife during the use of the machine.

The parts heretofore described are standard on a cloth cutting machine of the type shown, and are described merely to illustrate one type of machine on which our invention may be used. It will be understood, however, that this invention may be used in connection with other cloth cutting machines. In the form of our invention herein shown and described and which is now considered one of many constructions falling within the scope of our invention, the stop member is illustrated as being mounted on the presser foot of the cloth cutting machine, but it will be understood that the stop member or gage may be mounted on any other part of the machine. In the particular embodiment of our invention shown in the drawings, the member 20 of the presser foot is provided on its upper side with a longitudinal dove-tailed guide groove 23, and at its rear side with an upstanding lug 24 having a threaded opening therethrough.

25 designates a gage support which has a dove-tailed lower portion or guide member 26 and an upstanding arm 27, said arm having an opening therethrough horizontally alined with the tapped opening in the upstanding lug 24.

Threaded through the tapped opening in said upstanding lug 24 and extending through the opening in the upstanding arm 27, is an adjusting screw or rod 28 provided at one end with a stop head or member 29 which bears against the outer side of said upstanding arm and at its other end it is provided with a knurled head 30, or other suitable handle, preferably removable therefrom and by means of which it may be retained. The threaded portion of said adjusting screw or rod is in threaded engagement with the threaded opening of said upstanding lug 24 and said screw or rod is rotatable within the upstanding arm 27.

Carried by said adjusting screw or rod is a gage 31 which is in the form of a flat member having a rectangular portion 32 and an arm 33 extending from one corner of said rectangular portion and provided with a right-angled extension 34 having an opening 35 therein through which the unthreaded portion of the adjusting screw or rod is passed. Between the right-angled extension 34 of said gage and the upstanding arm 27, a spring or split-washer 36 is interposed, said washer being fitted on said adjusting screw or rod, which latter also has a stop member in the form of a collar 37 secured thereto against which the extension 34 of the arm 33 formed on said gage is pressed by the action of said spring or split washer, thereby maintaining said gage in any position it may be placed.

Extending rearwardly from said gage is a rod 38 having a laterally extending arm 39, which can be easily taken hold of for the purpose of swinging said gage on its pivot, said rod and its arm 39 serving as a handle for the gage and extending rearwardly so that the gage can be conveniently operated from the rear of the machine.

In normal position, the gage 31 is swung upwardly, as shown by dotted lines in Fig. 5, and when in this position the machine is adapted to be used as a cloth-cutting machine in the same manner as the standard cloth-cutting machines now in use. It is to be understood that when using the machine, the base is rolled forward underneath a stack of cloth to be cut according to pattern and the motor set into action, whereupon the knife 11 reciprocates at a high rate of speed, the lower cutting edge thereof penetrating the stack of cloth from the top while the front edge thereof cuts the cloth during the advancing of the machine along lines provided on patterns or on the uppermost layer of cloth, according to which pattern parts are to be cut from the stack of cloth. Since, however, pattern parts to be joined together by sewing must be properly matched along the seams connecting them, it has been the practice to slit or notch the marginal portions of the patterns where they are to be joined together in proper relation to assure the desired appearance and fit, and for best workmanship, and our invention as applied to a standard cloth-cutting machine enables the machine to be converted from a cloth-cutting machine into a slitting or notching machine, accomplished by swinging the gage 31 from the position shown in dotted lines in Fig. 5 to that shown in full lines. When in the last-mentioned position the free end 40 of the gage 31 moves against or into a position in close proximity to one side of the cutting knife, the front face of the gage being the desired distance from the longitudinal cutting edge of said knife, or from the plane of said longitudinal cutting edge, depending on whether the knife is in a low or a high position. However, the effective or cutting stroke of the knife is that portion thereof between the under surface of the presser foot 17 and the surface of the base 8, which latter is slotted to receive the lower end portion of the knife when approaching its lowermost position. The distance between the longitudinal cutting edge of the knife and the front face of the gage determines the depth of the slit or notch to be made in the marginal portions of pattern parts, and as said gage has considerable surface, it will be brought into contact with the edges of the pattern parts when in stacked relation and prevent the machine from being moved forward. Said gage therefore serves as a stop and acts to regulate or govern the amount of overhang which the knife has with respect to the stack of pattern parts. The amount of overhang of the knife should be less than the distance between the edge of the pattern part and a line along which a seam is to be made in said pattern part for connecting it with another pattern part, and this distance is determined to a nicety by the stop gage, which may be adjusted to increase or diminish the depth of the slits or notches in the pattern parts in accordance with the amount of overlap which a seam is to, or may have.

In order to adjust the front or stop surface of said gage with respect to the longitudinal cutting edge of the knife, the operator, regardless of the position the stop gage may be in, may rotate the adjusting screw or rod 28, increased depth of the slits being provided by rotating said screw or rod in one direction, and diminished depth by rotating the same in an opposite direction. In either case, the gage support 25 is caused to move within the dove-tailed groove of the presser foot, thereby adjusting the stop gage outwardly or inwardly to desired position, and by use of the spring or split washer 36, which exerts pressure against the stop gage, said gage will be automatically maintained in elevated position, as shown in dotted lines in Fig. 5, or in lowered position, as shown in full lines.

It will be apparent that the gage when swung into the position shown in full lines in Fig. 5 serves as a stop to limit the extent the knife may cut into a stack of cloth from the edge thereof.

By the use of our invention the usual slitting or notching machine may be dispensed with, thereby saving the cost of the same and also saving in time required for cutting and slitting the pattern parts.

Having thus described our invention, what we claim is:—

1. A cloth cutting machine having a base freely movable over a supporting surface and underneath the material to be cut, a standard rising upwardly from said base, a knife guided on said standard, said machine being adapted to advance in a forward direction to cut through a stack of material supported on said surface from the top to the bottom of the stack and said standard being movable through the cuts made by said knife, and means mounted on said machine and movable therewith and adapted to cooperate with the edge of the material to stop the further forward movement of said machine to limit the penetration of said knife through the stack of material.

2. A cloth-cutting machine movable over a supporting surface and having a knife movable in a direction to effect cutting, and means on said machine movable into an operative position in which said means will contact with an edge of a stack of material to be cut to limit the depth of the machine's travel from the edge of the cloth in a direction at an angle to said edge, said means being movable into an inoperative position in which the forward movement of the machine is unrestricted by said means.

3. A cloth cutting machine having a base adapted to pass beneath the material to be cut and a standard extending upwardly from the base and on which parts of the machine are mounted, a knife having a cutting edge arranged in advance of said standard, and adjustable means on said machine extending in rear of said knife to limit the extent to which said knife may enter into an edge of the material at an angle to said edge.

4. A cloth-cutting machine movable relatively to the cloth to be cut and having a reciprocating knife provided with a front cutting edge adapted to advance into a stack of cloth from one edge thereof, and means adapted to engage the edge of the stack to stop the forward movement of said knife into said stack of cloth from the edge thereof.

5. A cloth-cutting machine movable relatively to the cloth to be cut and having a reciprocating knife provided with a cutting edge adapted to be advanced by the forward movement of the machine into a stack of cloth from one edge thereof, means adapted to engage the edge of the stack to stop the forward movement of said knife into said stack of cloth from the edge thereof, and means for adjusting the position of said stop means relatively to said knife to vary the extent to which said knife may enter into said stack of cloth from the edge thereof.

6. A cloth-cutting machine having a reciprocating knife, a base adapted to be moved underneath a stack of cloth, an upright extending from said base and in which said knife is slidably fitted, means for reciprocating said knife, and means movable into operative or inoperative position to respectively stop the penetration of said knife into the cloth during a slitting operation, or to permit said knife to be advanced through the cloth for cutting the same into pattern parts.

7. A cloth-cutting machine having a base, a standard rising from said base and having a guide slot therein, a knife reciprocating within said standard, and a presser foot vertically adjustable and having a stop gage thereon adapted to limit the extent the knife may cut into a stack of cloth from the edge thereof.

8. A cloth-cutting machine having a movable knife adapted to cut a stack of cloth into pattern parts, a presser foot adapted to bear against or lie over the top layer of said stack of cloth, and a stop gage carried by said presser foot to limit the extent the knife may cut into the stack of cloth from the edge thereof.

9. A cloth-cutting machine having a vertically-reciprocating guided knife, a presser bar parallel with said knife, a presser foot at the lower end of said presser bar, and a movable stop gage in co-operative relation to said knife adapted to be swung from inoperative to operative position and when in operative position serving to limit the extent said knife may cut into a stack of cloth from the edge thereof.

10. A cloth-cutting machine having a vertically reciprocating guided knife, a vertically-adjustable presser bar parallel with and in advance of said knife, a presser foot at the lower end of said presser bar adapted to bear against or lie over the upper layer of a stack of cloth, and a pivoted stop gage on said presser foot adapted in one position to limit the extent said knife may cut into said stack of cloth from the edge thereof and in its other position allowing said knife to cut through the stack of cloth along lines outlining pattern parts.

11. A cloth-cutting machine having a vertically-reciprocating guided knife, a presser foot associated with said knife and adapted to bear against or lie over the upper layer of a stack of cloth to be cut according to pattern, and a stop gage pivotally secured to said presser foot and adapted to swing underneath said presser foot and in close proximity to said knife, said stop gage being adapted to engage the edge of said stack of cloth to limit the extent said knife may cut into said stack of cloth from the edge thereof.

12. A cloth-cutting machine, comprising a vertically-reciprocating guided knife, an adjustable presser foot co-operating with said knife, a pivotally mounted stop gage forwardly or rearwardly adjustable on said presser foot and adapted to swing beneath said presser foot or above the same, said stop gage when swung underneath said presser foot being adapted to serve as a stop to engage the edge of a stack of cloth and limit the extent to which said knife may cut into the stack of cloth from the edge thereof.

13. A cloth-cutting machine having a reciprocating guided knife, an adjustable presser foot having a portion extending forward from said knife and a portion extending to one side of said knife, a stop gage adjustable co-extensive with that portion of said presser foot at one side of said knife and movable to a position underneath said last-mentioned portion or above the same.

14. A cloth-cutting machine, comprising a base, a standard rising from said base, a knife guided in said standard for reciprocating movement, a vertically-adjustable presser bar parallel with said knife and in advance of the same, a presser foot at the lower end of said presser bar having a portion straddling said knife and said standard and having a guide groove on said portion, a stop gage slidably supported from said guide groove so as to move toward and from the longitudinal edge of said knife, means for moving said stop gage in the direction of said guide groove, and means for swinging said stop gage laterally toward or from said knife.

15. A cloth-cutting machine, comprising a base, a standard rising from said base, a reciprocating knife guided for movement in said standard, an adjustable presser bar forward of said knife, a presser foot at the lower end of said presser bar having a portion extending to one side of said knife and standard, said portion having a dove-tailed groove on its upper side, an upstanding arm guided for movement in said dove-tailed groove, and a stop gage pivotally supported by said upstanding arm.

16. In a cloth-cutting machine, a presser foot adapted to be positioned over a stack of cloth to permit of cutting the cloth to pattern while retaining the layers of the stack in position, said presser foot having an upstanding lug, an adjustable screw threaded through said lug, and a pivoted gage through which said adjusting screw is passed and on which it is retained against movement lengthwise thereon.

17. A cloth-cutting machine having a reciprocating guided knife and a presser foot co-operating with said knife and adapted to bear against or lie over a stack of cloth, said presser foot having a dove-tailed groove on its upper side and a lug extending therefrom provided with a threaded opening, a supporting arm having a dove-tailed portion fitting said dove-tailed groove, an adjusting screw threaded through the opening in said lug and passed through said supporting arm, said adjusting screw having a stop element bearing against one side of said supporting arm, and a stop gage pivotally secured to said adjusting screw and held against movement lengthwise thereon, said stop gage comprising a flat member having an arm extending therefrom provided with a right-angled extension having an opening through which said adjusting screw is passed, and a handle extending rearwardly from said stop gage.

18. A cloth-cutting machine, comprising a base, a standard rising from said base, a vertically-reciprocating knife guided for movement in said standard, a vertically-adjustable supported presser bar parallel with said knife and in advance of the same, a presser foot at the lower end of said presser bar having a slot extending inward from the rear edge thereof to provide two spaced members at opposite sides of said knife and standard, one of said members having a guide groove therein and an upstanding lug provided with a threaded opening, a supporting arm movable in said guide groove, an adjusting screw threaded through the threaded opening of said lug and rotatable in said supporting arm, a pivoted stop gage having a rectangular portion provided with an arm extending from one corner thereof and a right angled extension at the outer end of said arm provided with an opening through which said adjusting screw is passed, said adjusting screw having a stop member at one end bearing against one side of said supporting arm and a stop member between which and said supporting arm the right-angled extension of the arm of said stop gage is positioned, said stop gage being adapted to have its rectangular portion swung underneath said presser foot to limit the extent said knife may cut into a stack of cloth from the edge thereof, or above said presser foot to allow said knife to continue through the stack of cloth for cutting pattern parts therefrom.

In testimony whereof we affix our signatures.

MILTON G. SACKERMAN.
ISRAEL E. HELLER.